2,852,339

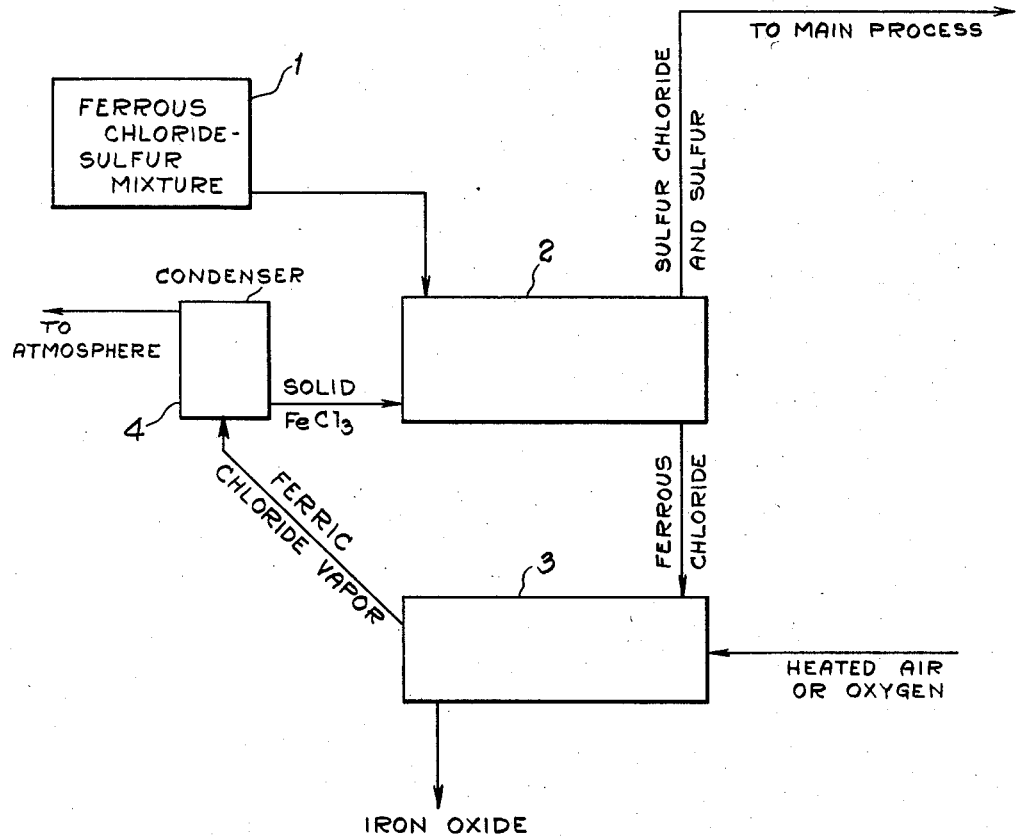
INVENTOR.
CYRIL T. HILL

United States Patent Office 2,852,339
Patented Sept. 16, 1958

PROCESS OF CHLORINATING IRON SULFIDE TO PRODUCE FERROUS CHLORIDE AND SULFUR

Cyril T. Hill, New York, N. Y., assignor to Texas Gulf Sulphur Company, New York, N. Y., a corporation of Texas Application January 21, 1955, Serial No. 483,268

8 Claims. (Cl. 23—87)

This invention relates to the recovery of the chlorine component of ferrous chloride formed in the decomposition of iron sulfide minerals by means of chlorinating agents. In such processes, including the one disclosed in my application Serial No. 417,413, filed March 19, 1954, ferrous chloride is produced by the interaction of the chlorinating agent with the sulfide mineral.

The economical operation of such processes requires that the chlorine combined with iron as ferrous chloride be recovered for reuse in the process, and various means have been suggested and used in the practical art in connection with chlorination processes hitherto known. For example, ferrous chloride has been oxidized to ferric chloride, which can itself be used as a chlorinating agent under certain conditions. The chlorine has also been recovered by converting the ferrous chloride to ferric chloride and then hydrolyzing the latter, obtaining ferric oxide and hydrogen chloride and then reducing the hydrogen chloride to obtain chlorine. Another means proposed has been the oxidation of the ferrous chloride to ferric chloride followed by further air oxidation to ferric oxide and chlorine, but this method not only involves the use of high temperatures but may further result in the circulation throughout the system of large amounts of nitrogen derived from the air. Equally it may lead to losses of sulfur relative to the extent to which unconsumed oxygen is present in the gas. Other disadvantages of such systems include operating under conditions that are conducive to corrosion of the equipment used, complexity of operation, and the like.

An object of my improved process for the recovery of chlorine is to make it possible to recover from ferrous chloride, in a form adapted for use as a chlorinating agent, the chemically combined chlorine. Other objects will be made clear from the specification that follows.

By the novel process of the present invention I react the mixture of ferrous chloride and sulfur which is derived from the main process, or any other ferrous chloride-sulfur mixture from which it is desired to recover the chlorine in active form, with ferric chloride, thereby releasing sulfur chloride and producing ferrous chloride. The ferrous chloride, after separation of any excess sulfur, is oxidized by heated air or oxygen to form the ferric chloride used in the first step together with an amount of iron oxide corresponding to the iron content of the ferrous chloride contained in the ferrous chloride-sulfur mixture. The ferrous chloride-sulfur mixture charged to my process should carry at least 35% of sulfur and, as recovered from the process of Serial No. 417,413, often will contain as much as 50% of sulfur by weight. The sulfur chloride produced may be passed directly to the main process, where it functions as a chlorinating agent, or recovered for further utilization as a chlorinating agent or otherwise as desired. As will be further described below, after an initial amount of ferric chloride to commence the reaction has been provided, it is not necessary to add any more excepting that required to make up operating losses and the only external reagent or material is oxygen, which may be supplied either undiluted or as air. A cyclic flow of iron chloride is provided, in which the iron changes from the ferric to the ferrous condition and back again, while ferrous chloride fed to the system is essentially converted to ferric oxide.

The attached drawing shows, in flow diagram form, the various steps in a preferred form of embodiment of the process, it being, of course, understood that variations hereinafter disclosed and other variations within the scope of the claims may be made without departing from the invention.

In the drawing, 1 designates a tank or other reservoir in which the ferrous chloride-sulfur mixture may be collected, although when the herein disclosed process is operated in conjunction with the process of application Serial No. 417,413 the mixture may be drawn directly from the appropriate stage of that process (herein referred to as the "main process") into the reaction vessel designated as 2 in the appended figure. The sulfur in the ferrous chloride-sulfur mixture melts at approximately 115–150° C., the ferrous chloride remaining solid and being suspended in the sulfur. The mixture may be tapped off my chlorination process at a temperature of approximately 350° C. and run into a mixer to which ferric chloride is added. The reaction proceeds readily at temperatures at or above the melting point of sulfur according to the following scheme:

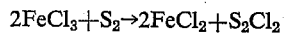

$$2FeCl_3 + S_2 \rightarrow 2FeCl_2 + S_2Cl_2$$

I prefer to carry out the reaction in reaction vessel 2 continuously, i. e. with continuous addition of the ferrous chloride-sulfur mixture and solid ferric chloride and with continuous withdrawal of the sulfur chloride, sulfur, and ferrous chloride. I may conveniently operate at atmospheric pressure and 135° C., which is the boiling point of sulfur chloride under the conditions, but since it is also necessary to separate excess sulfur before the next stage of the process, I ordinarily prefer to operate at temperatures of about 350° C., at which temperature the excess sulfur will also distill off. However, the process can be operated at temperatures between 135° C. and the boiling point of sulfur, in which case the sulfur is distilled off in an intermediate stage not shown in the flow diagram. I may use small amounts of a gas inert under the reaction conditions, such as nitrogen, sulfur dioxide or carbon dioxide to help remove the excess sulfur from the reaction mixture, it being essential that the ferrous chloride entering the next reaction stage designated on the flow diagram by the numeral 3 be free of sulfur.

A screw conveyor or other conventional means can be used to transfer the ferrous chloride from the stage designated by the numeral 2 to the stage designated by the numeral 3. This stage may be carried out in any conventional roasting apparatus. I prefer to use a rotary kiln or a hearth furnace provided with rabbling means, but fluid bed or other arrangements can be used effectively. Air or oxygen, preferably preheated to about 300° C., is admitted to the kiln or hearth furnace in at least the quantity called for by the reaction:

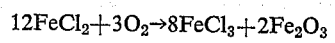

$$12FeCl_2 + 3O_2 \rightarrow 8FeCl_3 + 2Fe_2O_3$$

During the reaction, which is exothermic, the whole mass is maintained at a temperature above about 350° C., preferably 350–500° C., although higher temperatures may be used. Under the conditions, the ferric chloride vaporizes and is passed in vapor form into the condenser designated as 4 in the diagram. Nitrogen, excess air and oxygen are vented to the atmosphere and solid ferric chloride is transferred from the condenser to the stage where it is reacted with the ferrous chloride-sulfur mixture. The iron oxide produced in the oxidation stage is removed, and represents the iron content of the ferrous chloride originally charged to the process.

The following example is illustrative of the operation of my novel process. The quantities represent a balanced condition during continuous operation in terms of pounds per hour and do not include the ferric chloride charged to initiate the reaction.

Stage 1

Charge:
 200 lbs. ferrous chloride-sulfur mixture containing 100 lbs. ferrous chloride and 100 lbs. sulfur
Pressure: Atmospheric
Temperature: 300–350° C.
Products:
 100 lbs. sulfur chloride.
 53 lbs. sulfur
 290 lbs. ferrous chloride

Stage 2

Charge:
 290 lbs. ferrous chloride (from Stage 1)
 19 lbs. oxygen as air, preheated to 300° C.
Pressure: Atmospheric
Temperature: 375–425° C.
Products:
 Iron oxide 66 lbs., ferric chloride 243 lbs. (to first stage)

As disclosed above, the sulfur chloride produced in the first stage, and which is actually a complex system including sulfur chloride ($S_2Cl_2$) and sulfur and which may also include other chlorides of sulfur, is preferably utilized as the chlorine-carrying reagent in the main process of decomposing iron sulfides, and may conveniently be carried over as vapor and collected in the sulfur which I may use as a suspending liquid in the main process. Similarly, the excess sulfur may be carried as vapor into the main process. Alternatively, the sulfur chloride and sulfur may be separated and collected separately and used otherwise than in the main process. The sulfur chloride may be utilized directly in the form of a vapor or it may be condensed and used as a liquid.

Although I have disclosed operations at atmospheric pressure, and prefer to operate my chlorine recovery process at substantially atmospheric pressure, it is capable of operation at sub-and super-atmospheric pressures, with corresponding adjustments of temperature.

What is claimed is:

1. In the process of chlorinating iron sulfide to produce ferrous chloride and sulfur, the improvement which comprises passing the mixture of ferrous chloride and sulfur to a first reaction zone wherein ferric chloride is fed for reaction therewith at a temperature of about 135° C. to the boiling point of sulfur to produce a reaction product containing ferrous chloride, sulfur chloride and sulfur, separating the ferrous chloride therefrom and passing the same to an oxidation zone wherein the ferrous chloride is oxidized at a temperature of at least about 350° C. to essentially ferric chloride and iron oxide, and utilizing ferric chloride produced in the oxidation zone in the first reaction zone.

2. In the process of chlorinating iron sulfide to produce ferrous chloride and sulfur, the improvement which comprises passing the mixture of sulfur and ferrous chloride to a chlorination zone, passing ferric chloride to the chlorination zone, reacting ferric chloride and sulfur in the chlorination zone at a temperature of about 135° C. to the boiling point of sulfur to produce a reaction product containing ferrous chloride, sulfur chloride and sulfur, separating the ferrous chloride from the sulfur chloride and sulfur, utilizing the sulfur chloride for the chlorination of iron sulfide, oxidizing the ferrous chloride at a temperature of at least 350° C. to essentially iron oxide and ferric chloride and utilizing the ferric chloride thus produced for the chlorination of sulfur to sulfur chloride in the chlorination zone.

3. The process of claim 1 wherein the reaction between ferric chloride and sulfur is effected at a temperature of about 150° to about 350° C.

4. The process of claim 1 wherein the oxidation of ferrous chloride is effected by means of oxygen.

5. The process of claim 1 wherein the iron oxide produced is stoichemetrically equivalent to the amount of ferrous chloride produced from the chlorination of iron sulfide.

6. The process of claim 1 wherein the oxidation of ferrous chloride is effected by means of elemental oxygen and ferric oxide is obtained.

7. In the process of chlorinating iron sulfide to produce ferrous chloride and molten sulfur, the improvement which comprises passing the mixture of ferrous chloride and sulfur to a chlorination zone wherein ferric chloride reacts with the sulfur at a temperature of about 150° to 350° C. to produce a reaction product containing ferrous chloride, sulfur and sulfur chloride, separating ferrous chloride substantially free of volatile sulfur compounds from the reaction product, utilizing the sulfur chloride and sulfur in the chlorination of iron sulfide, passing the separated ferrous chloride to an oxidation zone to which is charged air for the oxidation of ferrous chloride at a temperature of about 350° to 500° C. to essentially ferric oxide and ferric chloride, the ferric oxide thus produced is stoichemetrically equivalent to the ferrous chloride produced from the chlorination of iron sulfide, passing ferric chloride from the oxidation zone to the chlorination zone.

8. A process for converting ferrous chloride to ferric oxide which comprises oxidizing ferrous chloride to ferric chloride and ferric oxide at a temperature of at least about 350° C., separating ferric chloride from ferric oxide and reacting the same with sulfur at a temperature of about 135° C. to the boiling point of sulfur to produce sulfur chloride and ferrous chloride, separating ferrous chloride from sulfur chloride and passing the same to the oxidation step and charging ferrous chloride to the oxidation step in an amount stoichemetrically equivalent to the quantity of ferric oxide which is produced.

References Cited in the file of this patent

UNITED STATES PATENTS

| | | |
|---|---|---|
| 1,898,702 | Wescott | Feb. 21, 1933 |
| 1,917,229 | Bacon et al. | July 11, 1933 |
| 1,928,406 | Bacon et al. | Sept. 26, 1933 |

OTHER REFERENCES

Mellor: "Treatise on Inorganic and Theoretical Chemistry," (1930), vol. 10, page 633.

UNITED STATES PATENT OFFICE
CERTIFICATE OF CORRECTION

Patent No. 2,852,339                                  September 16, 1958

Cyril T. Hill

It is hereby certified that error appears in the printed specification of the above numbered patent requiring correction and that the said Letters Patent should read as corrected below.

Column 3, following line 12, add:

-- 243 lbs. ferric chloride --

Signed and sealed this 25th day of November 1958.

(SEAL)
Attest:

KARL H. AXLINE
Attesting Officer

ROBERT C. WATSON
Commissioner of Patents